United States Patent
Terwilliger et al.

(10) Patent No.: US 12,546,250 B2
(45) Date of Patent: Feb. 10, 2026

(54) STEAM TURBINE BYPASS FOR INCREASED WATER HEAT ABSORPTION CAPACITY STEAM INJECTED TURBINE ENGINE

(71) Applicant: Raytheon Technologies Corporation, Farmington, CT (US)

(72) Inventors: Neil J. Terwilliger, Cheshire, CT (US); Joseph E. Turney, Amston, CT (US)

(73) Assignee: RTX CORPORATION, Farmington, CT (US)

( * ) Notice: Subject to any disclaimer, the term of this patent is extended or adjusted under 35 U.S.C. 154(b) by 127 days.

(21) Appl. No.: 18/108,372

(22) Filed: Feb. 10, 2023

(65) Prior Publication Data
US 2024/0271548 A1    Aug. 15, 2024

(51) Int. Cl.
  *F02C 3/30*  (2006.01)
  *B64D 27/02*  (2006.01)
  (Continued)

(52) U.S. Cl.
  CPC ............ *F02C 3/305* (2013.01); *B64D 27/026* (2024.01); *B64D 27/24* (2013.01); *F01D 13/02* (2013.01);
  (Continued)

(58) Field of Classification Search
  CPC .... F02C 1/007; F02C 3/30–305; F02C 6/206; F02C 6/18; F01K 17/025; F01K 21/047; F01K 23/00–18; F01K 7/22; F01K 7/24; F01K 7/18; F01K 7/20; F01K 7/02–04; F01K 7/165; F01K 7/28; F01K 7/32;
  (Continued)

(56) References Cited

U.S. PATENT DOCUMENTS 3,978,661 A * 9/1976 Cheng ................... F01K 21/047
                                                        60/39.5
4,589,255 A * 5/1986 Martens ................. F01D 19/02
                                                        60/657
(Continued)

FOREIGN PATENT DOCUMENTS

| WO | 2010084525 A1 | 7/2010 |
| WO | 2013046791 A1 | 4/2013 |
| WO | 2022028651 A1 | 2/2022 |

OTHER PUBLICATIONS

Wikipedia entry on Mar. 15, 2022 for "Control Valves", https://en.wikipedia.org/wiki/Control_valve, sourced from the "Fisher Control Valve Handbook", fourth edition, published in 1977 (Year: 2022).*

(Continued)

*Primary Examiner* — Stephanie Sebasco Cheng
(74) *Attorney, Agent, or Firm* — Carlson, Gaskey & Olds, P.C.

(57) ABSTRACT

A turbine engine assembly includes a core engine that generates an exhaust gas flow, a condenser where water is extracted from the exhaust gas flow, an evaporator where heat is input into the water that is extracted by the condenser to generate a first steam flow, a first steam turbine where the first steam flow is expanded and cooled to generate a first cooled flow, a bypass passage that defines a path for the first steam flow around the first steam turbine, and a superheater where at least one of the first steam flow and the first cooled flow is reheated to generate a second steam flow.

15 Claims, 2 Drawing Sheets

(51) Int. Cl.
*B64D 27/24* (2024.01)
*F01D 13/02* (2006.01)
*F01D 17/08* (2006.01)
*F01D 17/10* (2006.01)
*F01D 17/14* (2006.01)
*F01D 25/32* (2006.01)
*F01K 17/02* (2006.01)
*F01K 23/10* (2006.01)
*F01K 23/16* (2006.01)
*F02C 6/18* (2006.01)
*G01N 25/60* (2006.01)

(52) U.S. Cl.
CPC ............ *F01D 17/08* (2013.01); *F01D 17/085* (2013.01); *F01D 17/105* (2013.01); *F01D 17/145* (2013.01); *F01D 25/32* (2013.01); *F01K 17/025* (2013.01); *F01K 23/10* (2013.01); *F01K 23/16* (2013.01); *F02C 6/18* (2013.01); *G01N 25/60* (2013.01); *F05D 2220/323* (2013.01); *F05D 2220/72* (2013.01); *F05D 2220/74* (2013.01); *Y02E 20/16* (2013.01); *Y02T 50/50* (2013.01); *Y02T 50/678* (2013.01)

(58) Field of Classification Search
CPC ...... F01K 17/00–06; F01K 13/02; F01K 3/22; F05D 2220/722; F05D 2220/10; F05D 2220/323–327; F05D 2220/36; F05D 2220/50; F05D 2220/74; Y02E 20/14–18; B64D 27/24; B64D 27/026; B64D 27/10–14; F01D 17/08–085; F01D 17/105; F01D 17/145; G01N 25/60
See application file for complete search history.

(56) References Cited

U.S. PATENT DOCUMENTS

| | | | |
|---|---|---|---|
| 4,680,927 A | 7/1987 | Cheng | |
| 5,896,740 A | 4/1999 | Shouman | |
| 9,739,178 B2* | 8/2017 | Herzog | F01K 7/223 |
| 9,828,883 B2* | 11/2017 | Schuster | F01K 13/003 |
| 10,794,231 B2 | 10/2020 | Maalouf | |
| 11,976,580 B2* | 5/2024 | Klingels | F01K 21/005 |
| 2008/0034758 A1 | 2/2008 | Marin et al. | |
| 2010/0329853 A1* | 12/2010 | Guo | F01D 9/065 |
| | | | 415/169.2 |
| 2012/0174584 A1* | 7/2012 | Bennauer | F01K 7/22 |
| | | | 60/657 |
| 2016/0033128 A1* | 2/2016 | Stuxberg | F01K 7/34 |
| | | | 60/692 |
| 2021/0207500 A1 | 7/2021 | Klingels et al. | |

OTHER PUBLICATIONS

Extended European Search Report for European Application No. 23215255.3 mailed Jun. 13, 2024.

* cited by examiner

STEAM TURBINE BYPASS FOR INCREASED WATER HEAT ABSORPTION CAPACITY STEAM INJECTED TURBINE ENGINE

STATEMENT REGARDING FEDERALLY SPONSORED RESEARCH OR DEVELOPMENT

This invention was made with Government support under Contract No.: DE-AR0001561 awarded by the United States Department of Energy, Office of ARPA-E. The Government has certain rights in this invention.

TECHNICAL FIELD

The present disclosure relates generally to a steam injected turbine engine and more particularly to a steam injection system that increases a heat absorption capacity of an extracted water flow and a bypass passage for controlling condensation accumulation.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Water can be extracted from the exhaust gas flow and transformed into a steam flow and injected into the core flow to enhance engine efficiency. Additionally, the recovered water flow can be utilized to absorb and recover heat from the exhaust gas flow. The recovered heat can be used to generate mechanical power in a steam turbine. The amount of heat available may not always be sufficient to generate a steam flow to drive the steam turbine. Moreover, condensation accumulation may reduce gains in efficiency provided by recovered heat.

Turbine engine manufacturers continue to seek further improvements to engine performance including improvements to reduce environmental impact while improving thermal and propulsive efficiencies.

SUMMARY

A turbine engine assembly according to an example disclosed embodiment, includes, among other possible things, a core engine that generates an exhaust gas flow, a condenser where water is extracted from the exhaust gas flow, an evaporator where heat is input into the water that is extracted by the condenser to generate a first steam flow, a first steam turbine where the first steam flow is expanded and cooled to generate a first cooled flow, a bypass passage that defines a path for the first steam flow around the first steam turbine, and a superheater where at least one of the first steam flow and the first cooled flow is reheated to generate a second steam flow.

In a further embodiment of the foregoing, the turbine engine includes a valve that regulates flow through the bypass passage and a controller that is programmed to operate the valve to route the first heated flow around the first steam turbine at a takeoff engine operating condition.

In a further embodiment of any of the foregoing, the turbine engine includes a valve that regulates flow through the bypass passage and a controller that is programmed to operate the valve to route the first heated flow around the first steam turbine in response to a steam quality that begins to fall below a predefined amount.

In a further embodiment of any of the foregoing, the turbine engine includes a second steam turbine where a steam flow from the superheater is expanded to generate shaft power.

In a further embodiment of any of the foregoing, at least one of the first steam turbine and the second steam turbine is mechanically coupled to an engine spool.

In a further embodiment of any of the foregoing, the core engine includes a core flow path and at least one of the first steam flow and the second steam flow is injected into the core flow path.

In a further embodiment of any of the foregoing, the turbine engine assembly includes a pump where water extracted from the condenser is pressurized before being communicated to the first evaporator.

In a further embodiment of any of the foregoing, a pressure of water at the first evaporator is greater than a pressure of water at the superheater.

In a further embodiment of any of the foregoing, the first evaporator and the superheater are disposed within a flow path for the exhaust gas flow.

In a further embodiment of any of the foregoing, the first evaporator receives the exhaust gas flow after the superheater.

In a further embodiment of any of the foregoing, the turbine engine assembly includes a fuel system where a hydrogen based fuel flow is communicated to a combustor of the core engine.

An aircraft propulsion system according to another example disclosed embodiment, includes, among other possible things, a core engine assembly that includes a compressor where an inlet airflow is compressed and communicated to a combustor where a compressed core flow is mixed with fuel and ignited to generate an exhaust gas flow that is expanded through a turbine section to generate shaft power, a hydrogen based fuel system for supplying a hydrogen based fuel to the combustor, a condenser where water is extracted from the exhaust gas flow, a first evaporator where heat is input into the water that is extracted by the condenser to generate a first steam flow, a first steam turbine where the first steam flow is expanded and cooled to generate a first cooled flow, a superheater where at least one of the first steam flow and the first cooled flow is reheated to generate a second steam flow, a bypass passage that defines a path for first steam flow around the first steam turbine to the superheater, a second steam turbine where the second steam flow from the superheater is expanded and cooled, a valve that regulates flow through the bypass passage, and a controller that is programmed to operate the valve to route the first steam flow around the first steam turbine in response to a predefined engine operation condition.

In a further embodiment of the foregoing, the predefined engine operating condition includes a takeoff engine operating condition.

In a further embodiment of any of the foregoing, the predefined engine operating condition includes a steam quality below predefined value.

In a further embodiment of any of the foregoing, the core engine includes a core flow path and the second steam flow is injected into the core flow path.

A method of operating a steam injected turbine engine according to another example disclosed embodiment, includes, among other possible things, transforming a water flow into a first steam flow with a first heat input, determining a condition of the first steam flow, bypassing the first steam flow around a first steam turbine to a second heat input in response to the determined condition of the first steam flow being indicative of condensation greater than a pre-defined amount, generating a second steam flow with the second heat input, and injecting the second steam flow into a core flow path of a core engine.

In a further embodiment of the foregoing, the method further includes expanding the first steam flow through a first steam turbine to cool the first steam flow in response to the determined condition of the first steam flow being indicative of a condensation below the predefined amount followed by reheating with the second heat input to generate the second steam flow.

In a further embodiment of any of the foregoing, the method includes operating a valve to route the first steam flow through a bypass in response to the determined condition of the first steam flow.

In a further embodiment of any of the foregoing, the first heat input is from an exhaust gas flow in a first evaporator and the second heat input is from the exhaust gas flow in a superheater.

In a further embodiment of any of the foregoing, the method includes pressurizing the water flow before transformation into the first steam flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
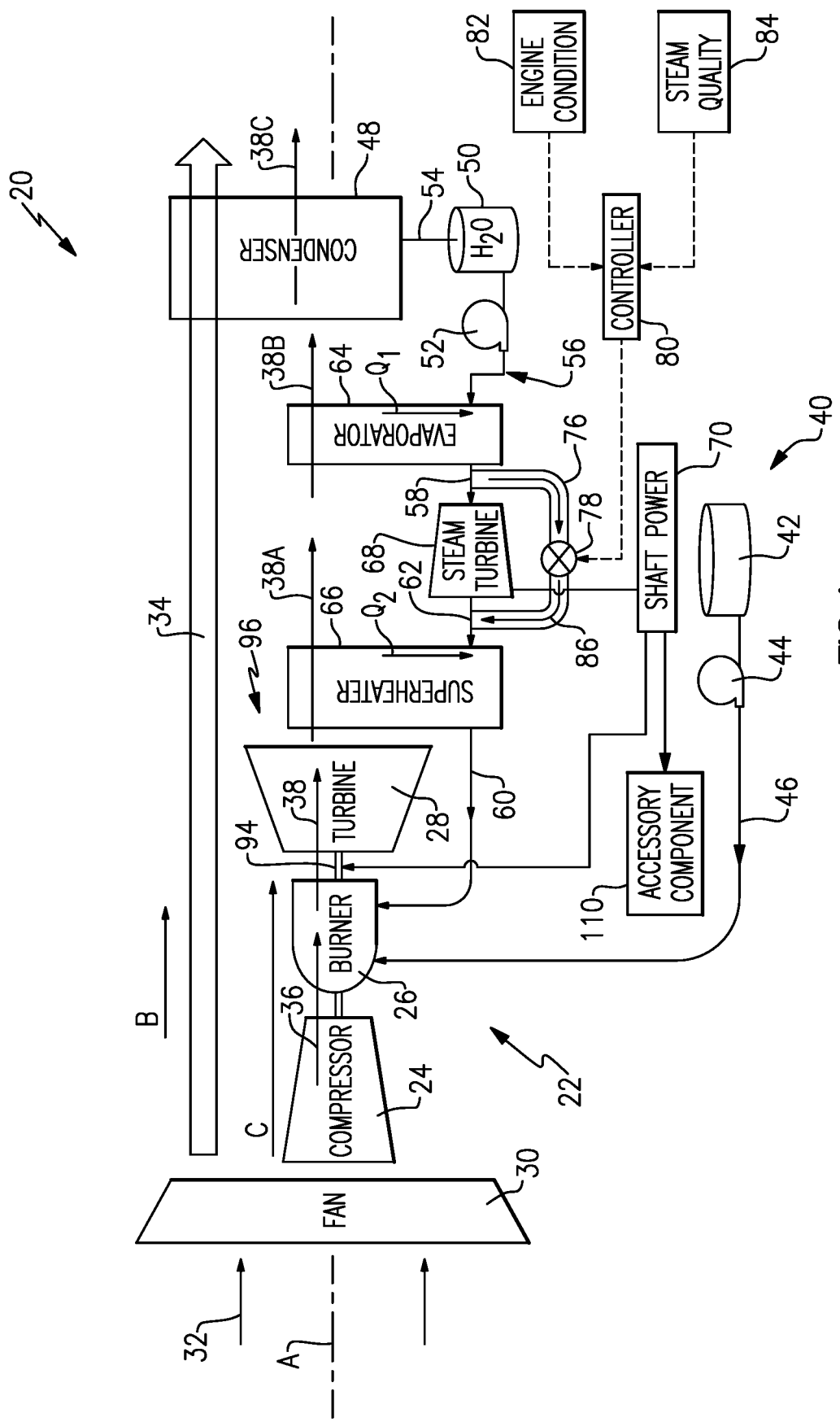
FIG. 1 is a schematic view of an example turbine engine embodiment.

FIG. 1 schematically illustrates an engine assembly 20 where steam is injected into the core flow path C to increase mass flow through a turbine section 28 and thereby provide increased power without additional work from a compressor section 24. Water for generating the steam is recovered from the exhaust gas flow. The water is further utilized to recover thermal energy from the exhaust gas flow 38. A steam turbine 68 provides a means of increasing the heat absorption capacity of the recovered water without a corresponding increase in the amount of water recovered from the exhaust gas flow 38.

Condensation can accumulate during certain engine operating conditions due to insufficient heat availability. Moreover, during some engine operating conditions, an initial heat input may not be sufficient to generate a steam flow of desired quality for use in the steam turbine. The disclosed engine assembly includes a bypass passage for routing an initial steam flow around the steam turbine for further heating prior to injection into the core flow path C. Selective routing of a steam flow around the steam turbine at select operating conditions can control condensation accumulation and increase engine efficiencies.

The engine assembly 20 includes a core engine 22 with a fan 30, the compressor section 24, a combustor section 26 and the turbine section 28 disposed serially along an engine axis A. The compressor section 24 is coupled to the turbine section 28 by a shaft 94 to define an engine spool 96. The fan 30 drives inlet airflow 32 into a bypass flow path B and a core flow path C. In the compressor section 24, a core flow 36 is compressed and communicated to the combustor section 26. In the combustor section 26, compressed core airflow 36 is mixed with a fuel flow 46 and ignited to generate the high energy combusted exhaust gas flow 38 that is expanded through the turbine section 28 to extract energy to drive the compressor section 24 and the fan 30.

A steam flow 60 is injected into the core flow 36 and increases mass flow through the turbine section 28 and thereby increases engine power and efficiency. The increased engine power is due to an increasing mass flow through the turbine section 28 without a corresponding increase in work from the compressor section 24.

A fuel system 40 includes a fuel tank 42 and a fuel pump 44 for generating the fuel flow 46. The example fuel system 40 is configured to provide a hydrogen based fuel such as liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional hydrocarbon based fuels.

Energy from the exhaust gas flow 38 is recovered as heat input into water recovered by a condenser 48. A water flow 54 from the condenser 48 is communicated at or near ambient pressures to a water tank 50. A pump 52 communicates a pressurized water flow 56 to a first evaporator 64. In one example embodiment, the pressurized water flow 56 is of high pressure in the range of between 1500 PSI and 5000 PSI. In another example embodiment, the pressurize water flow 56 is communicated to the first evaporator 64 at a pressure of about 2000 PSI.

The first evaporator 64 inputs a first amount of heat, Q1, into the pressurized water flow 56 to generate a first steam flow 58. If the first steam low 58 is of a sufficient quality it can be routed to a first steam turbine 68 to generate shaft power 70. Expansion through the steam turbine 68 cools the first steam flow 58 and generates a cooled steam flow 62 that is exhausted from the steam turbine 68.

The cooled steam flow 62 has an increased capacity to absorb heat as compared to the first steam flow 58. The cooled steam flow 62 is also at a lower pressure and communicated to a superheater 66. The superheater 66 is closer to the turbine section 28 than the first evaporator 64 and is therefore exposed to a higher temperature exhaust gas flow 38A as compared to the exhaust gas flow 38B that is communicated downstream to the first evaporator 64. Expansion through the steam turbine 68 reduces the pressure of the cooled flow 62 and the pressures within the superheater 66.

A second heat input, Q2, into the cooled flow 62 produces a second steam flow 60 that is injected into the core flow 36. In one example embodiment, the second steam flow 60 is injected into the core flow 36 at the combustor 26. However, the second steam flow 60 may be injected upstream of the combustor 26 or other locations within the core flow path C.

The steam turbine 68 generates the shaft power 70 that can be used to drive engine and/or aircraft accessory components 110. The shaft power 70 may also be coupled to the engine spool 96 for providing additional power for engine operation. Moreover, although a single steam turbine 68 is disclosed by way of example, several steam turbines could be utilized and receive the first steam flow 58 and emit a cooled and lower pressure cooled flow 62.

In some engine operating conditions, the first heat input Q1, is not sufficient to generate steam of a desired quality. In other engine operating conditions, where the first heat input Q1 does generate pure vapor, expansion through the steam turbine 68 may produce cooled flow 62 of insufficient quality such that the steam turbine 68 is subject to erosion and other issues. Steam quality is a value indicative of a ratio of vapor to liquid in a steam flow. A steam quality of 100% indicates all vapor. A steam quality of 95% indicates 95% vapor and 5% liquid. The more liquid in the steam flow, the greater chance for an undesired accumulation of condensation. Moreover, steam of a lower quality may not have sufficient energy to drive the steam turbine as desired.

The steam quality may be indicative of insufficient heat presence in the exhaust gas flow portion 38B within the first evaporator 64. Heat may be insufficient due to engine operating conditions, such as during idling and engine takeoff operations. The inlet and outlet of the steam turbine 68 can become saturated with condensation if engine conditions and heat input is not sufficient.

The example engine 20 includes a bypass passage 76 to route the first steam flow 58 around the first steam turbine 68 in response to a predefined set of engine operating conditions. The predefined engine operating conditions may include, among other possible things, one or more temperatures, pressures, power settings and/or any other engine condition indicative of insufficient heat to produce heat of a desired quality. A valve 78 is provided in the bypass passage 76 and is operated by a controller 80. The controller 80 is programmed to actuate the valve 78 to control a bypass flow 86 based on information indicative of an engine operating condition as schematically shown at 82 and/or steam quality, schematically shown at 84. In one example embodiment, the controller 80 is programmed to open the bypass passage 76 during takeoff operations. In another example embodiment, the controller 80 is programmed to close the valve 78 and force flow through the first steam turbine 68 during cruise conditions.

In another example embodiment, the controller 80 is programmed to open the valve 78 to bypass flow around the first steam turbine 68 based on information indicative of steam quality 84. The steam quality 84 may be determined by measurements indicative of pressure and temperatures of the first steam flow 58 and may be descriptive of the steam quality entering the steam turbine 68 or may be descriptive of the steam quality that would exit the steam turbine 68 without being bypassed. The steam quality 84 may also be determined based on other engine operating conditions that are indicative of a certain range of steam quality.

In one example embodiment, the controller 80 is programmed to open the valve 78 to bypass flow around the first steam turbine in response to indications that a steam quality is below 85%. In another example embodiment, the threshold for bypassing flow is a steam quality that is less than about 90% at the turbine exit.

Moreover, the controller 80 may be programmed to operate utilizing a predictive model of steam quality at an exit of the steam turbine 68. The controller 80 may utilized the predictive model to predict a steam quality at the exit of the steam turbine 68 based on inlet temperature and pressure of the system without an open bypass. Once the predicted steam quality reaches a predefined predicted steam quality the bypass valve 78 can be closed to direct steam through the steam turbine 68.

It should be appreciated, that other example threshold values for steam quality or engine operating conditions could be utilized and are within the scope and contemplation of this disclosure. It should also be appreciated that once the steam turbine is bypassed, the exit quality of the first steam turbine would be estimated by the controller based on the temperature and pressure of the first steam flow 58 and the known design characteristics of the steam turbine in order to determine when the inlet steam temperature is sufficient to permit closing the bypass valve 78

The example controller 80 relates to a device and system for performing necessary computing or calculation operations. This system may be specially constructed for this purpose, or it may comprise a portion of an overall engine controller selectively activated or reconfigured by a computer program stored in the computer. The computer program and also data required for its execution may be stored in a computer readable storage medium, such as, but is not limited to, any type of disk including floppy disks, optical disks. CD-ROMs, magnetic-optical disks, read-only memories (ROMs), random access memories (RAMS), EPROMS, EEPROMs, magnetic or optical cards, application specific integrated circuits (ASICs), or any type of media suitable for storing electronic instructions.

Figure 2:
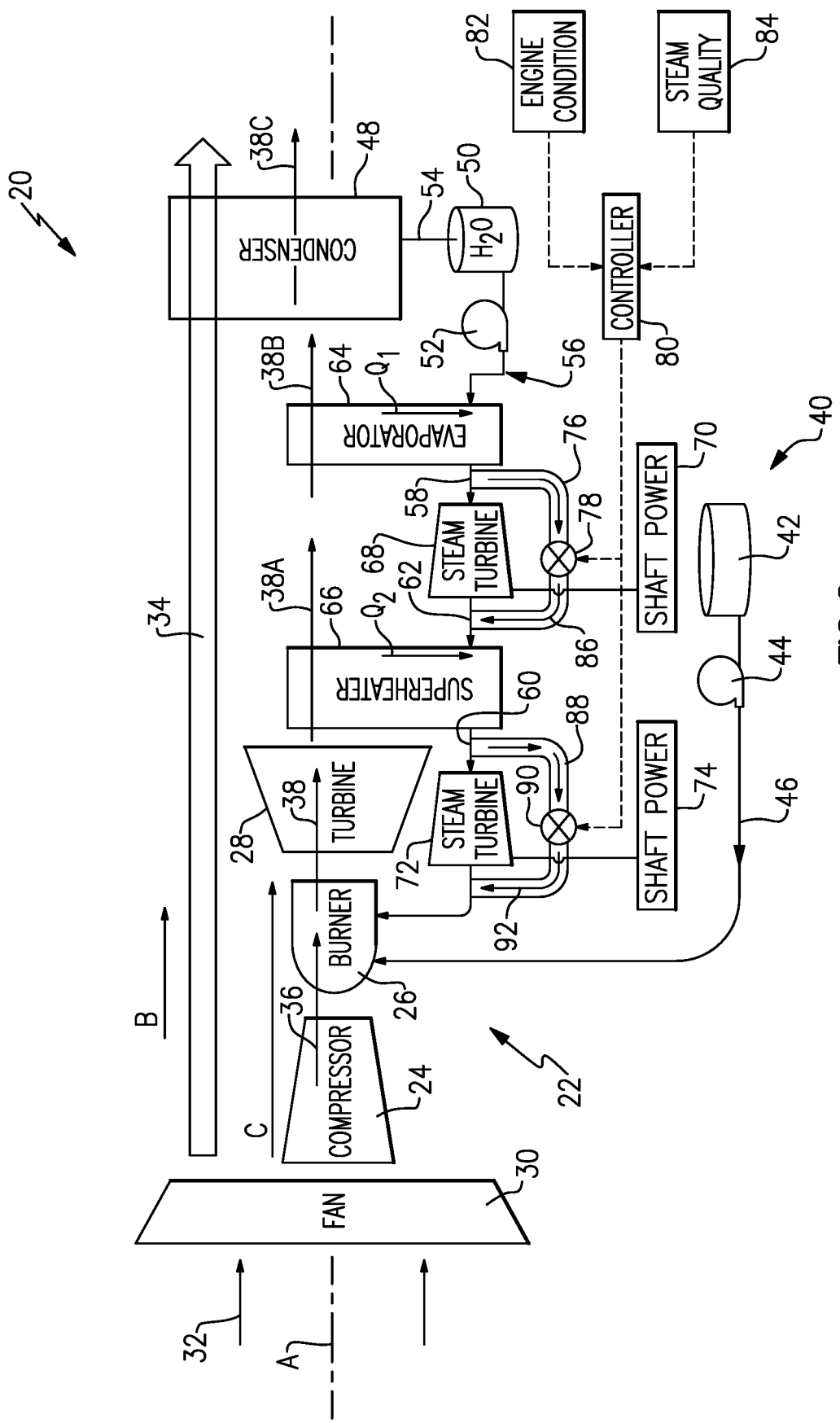
FIG. 2 is a schematic view of another example turbine engine embodiment.

Referring to FIG. 2, the example engine assembly 20 is shown with a second steam turbine 72 that is downstream of the superheater 66. The second steam turbine 72 receives the second steam flow 60 that has been exposed to a second heat input Q2 in the superheater. The second steam turbine 72 may generate shaft power 74 to drive engine accessory components. The second heat input Q2 is of higher temperature due to the closer proximity to the exit of the turbine section 28. A second bypass passage 88 is provided to route steam flow around the second steam turbine 72. A valve 90 is actuated by the controller 80 based on engine operating conditions, steam quality and/or other criteria that provides for improved engine power and efficiency. The second bypass passage 88 provides for a second bypass steam flow 92 to be communicated directly to the combustor 26 without first driving the second steam turbine 72.

Although first and second steam turbines 68, 72 are disclosed by way of example, additional steam turbines could be included with or without bypass passages to provide for tailoring of engine operations based on steam quality, engine operation and any other engine or aircraft operating parameters.

Referring back to FIG. 1, in one disclosed operational embodiment, water 54 is extracted from a portion of the exhaust gas flow 38C in communication with the condenser 48. The exhaust gas flow portion 38C passing through the condenser 48 has rejected some heat in the first and second heat exchangers 64, 66. Accordingly, the exhaust gas flow portion 38C is cooler than it would be upstream of the condenser 48. A cooling flow cools the exhaust gas flow portion 38C to condense water 54. In one disclosed embodiment, the bypass airflow 34 provides cooling as a heat sink for the condenser 48. Other cooling flows could be utilized and are within the scope and contemplation of this disclosure.

The recovered water 54 is pressurized by a pump 52 to a pressure of about 2000 PSI and communicated to the first evaporator 64. The first heat input Q1 from the exhaust gas flow portion 38B in the first evaporator 64 is absorbed by the pressurized water flow 56 to generate the first steam flow 58. Other heat sources may also input heat into the pressurized water flow 56 and are within the contemplation and scope of this disclosure.

If the first steam flow 58 is of a sufficient steam quality, for example above 90%, it is communicated to the first steam turbine 68 to generate shaft power 70 and to provide a cooled flow 62. Moreover, if the engine is operating at a predefined condition, such as for example a cruise operating condition, the first steam flow 58 would be communicated to the first steam turbine 68. Although some example some example criteria for passing steam to the first steam turbine are disclosed, other criteria may be used and are within the scope and contemplation of this disclosure.

If the first steam flow 58 is not of sufficient quality, pressure, and temperature conditions, and/or the engine is operating at a predefined condition that warrants bypass of the steam turbine 68, the valve 78 will be opened to open the bypass passage 76. In one disclosed example, the bypass flow 86 is routed to the superheater 66 and further heated by the second heat input Q2. The second heat input Q2 is hotter than the first heat input Q1 due to the closer proximity to the turbine section 28. A second steam flow 60 is generated and communicated to the combustor 26.

During engine operation where the first steam flow 58 is expanded through the first steam turbine 68, shaft power 70 is generated and utilized to drive accessory components. The expansion of the first steam flow 58 though the first steam turbine 68 increases the capacity for heat absorption to improve engine efficiency. Moreover, the bypass passage 76 enables tailoring the use of steam to engine operating conditions to maintain engine efficiency gains and prevent condensation accumulation.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
   a core engine generating an exhaust gas flow;
   a condenser where water is extracted from the exhaust gas flow;
   an evaporator where heat is input into the water extracted by the condenser to generate a first steam flow;
   a first steam turbine where the first steam flow is expanded and cooled to generate a first cooled flow;
   a bypass passage defining a path for the first steam flow around the first steam turbine;
   a superheater where at least one of the first steam flow and the first cooled flow is reheated to generate a second steam flow;
   a valve regulating flow through the bypass passage; and
   a controller programmed to:
      open the valve to route the first steam flow around the first steam turbine in response to a steam quality of the first steam flow being below a predefined amount,
      use a temperature and pressure of the first steam flow at an inlet to the first steam turbine while the valve is open, to determine a predicted steam quality of what would be the first cooled flow at an exit of the first steam turbine if the valve were closed, and
      close the valve when the predicted steam quality reaches a predefined predicted steam quality.

2. The turbine engine assembly as recited in claim 1, wherein the controller is further programmed to operate the valve to route the first steam flow around the first steam turbine at a takeoff engine operating condition.

3. The turbine engine assembly as recited in claim 1, including a second steam turbine where the second steam flow from the superheater is expanded to generate shaft power.

4. The turbine engine assembly as recited in claim 3, wherein at least one of the first steam turbine and the second steam turbine is mechanically coupled to an engine spool.

5. The turbine engine assembly as recited in claim 1, wherein the core engine includes a core flow path and the second steam flow is injected into the core flow path.

6. The turbine engine assembly as recited in claim 1, including a pump where the water extracted by the condenser is pressurized before being communicated to the evaporator.

7. The turbine engine assembly as recited in claim 6, wherein the evaporator receives the exhaust gas flow after the superheater.

8. The turbine engine assembly as recited in claim 1, wherein the evaporator and the superheater are disposed within a flow path for the exhaust gas flow.

9. The turbine engine assembly as recited in claim 1, including a fuel system where a hydrogen based fuel flow is communicated to a combustor of the core engine.

10. An aircraft propulsion system comprising:
    a core engine assembly including a compressor where an inlet airflow is compressed to generate a compressed core flow that is communicated to a combustor where the compressed core flow is mixed with fuel and ignited to generate an exhaust gas flow that is expanded through a turbine section to generate shaft power;
    a hydrogen based fuel system for supplying a hydrogen based fuel to the combustor;
    a condenser where water is extracted from the exhaust gas flow;
    a first evaporator where heat is input into the water extracted by the condenser to generate a first steam flow;
    a first steam turbine where the first steam flow is expanded and cooled to generate a first cooled flow;
    a superheater where at least one of the first steam flow and the first cooled flow is reheated to generate a second steam flow;
    a bypass passage defining a path for the first steam flow around the first steam turbine to the superheater;
    a second steam turbine where the second steam flow from the superheater is expanded and cooled;
    a valve regulating flow through the bypass passage; and
    a controller programmed to:
       open the valve to route the first steam flow around the first steam turbine in response to a steam quality of the first steam flow being below a predefined amount,
       use a temperature and pressure of the first steam flow at an inlet to the first steam turbine while the valve is open, to determine a predicted steam quality of what would be the first cooled flow at an exit of the first steam turbine if the valve were closed, and
       close the valve when the predicted steam quality reaches a predefined predicted steam quality.

11. The aircraft propulsion system as recited in claim 10, wherein the predefined engine operating condition further comprises a takeoff engine operating condition.

12. The aircraft propulsion system as recited in claim 10, wherein the core engine assembly includes a core flow path and the second steam flow is injected into the core flow path.

13. A method of operating a steam injected turbine engine comprising:

transforming a water flow into a first steam flow with a first heat input;

determining a condition of the first steam flow;

bypassing the first steam flow around a first steam turbine, through a bypass with a valve operated by a controller, to a second heat input in response to the determined condition of the first steam flow being indicative of condensation greater than a predefined amount;

using a temperature and pressure of the first steam flow at an inlet to the first steam turbine while the first steam flow is bypassing the first steam turbine, to determine a predicted steam quality of what would be a first cooled flow at an exit of the first steam turbine if the first steam flow was expanded through the first steam turbine without being bypassed around the first steam turbine;

operating the valve to stop bypassing the first steam flow around the first steam turbine when the predicted steam quality reaches a predefined predicted steam quality;

generating a second steam flow with the second heat input; and injecting the second steam flow into a core flow path of a core engine.

14. The method as recited in claim 13, wherein the first heat input is from an exhaust gas flow in a first evaporator and the second heat input is from the exhaust gas flow in a superheater.

15. The method as recited in claim 13, including pressurizing the water flow before transformation into the first steam flow.

* * * * *